(12) United States Patent
Weber et al.

(10) Patent No.: US 10,510,122 B2
(45) Date of Patent: Dec. 17, 2019

(54) DATA-DRIVEN CONCEPTS FOR PROCESSING CLAIMS

(71) Applicant: Change Healthcare Holdings, LLC, Nashville, TN (US)

(72) Inventors: Tracy Ann Weber, Southbury, CT (US); David Sheldon, Simsbury, CT (US); Prasanth Vijayakumar, Stamford, CT (US); Gregory Williams, Marblehead, MA (US)

(73) Assignee: CHANGE HEALTHCARE HOLDINGS, LLC, Nashville, TN (US)

( * ) Notice: Subject to any disclaimer, the term of this patent is extended or adjusted under 35 U.S.C. 154(b) by 995 days.

(21) Appl. No.: 15/008,584

(22) Filed: Jan. 28, 2016

(65) Prior Publication Data

US 2016/0140664 A1    May 19, 2016

Related U.S. Application Data

(63) Continuation of application No. 13/444,170, filed on Apr. 11, 2012, now abandoned, which is a continuation-in-part of application No. 13/435,119, filed on Mar. 30, 2012, now abandoned.

(51) Int. Cl.
*G06Q 40/08* (2012.01)
*G06Q 10/10* (2012.01)

(52) U.S. Cl.
CPC ............ *G06Q 40/08* (2013.01); *G06Q 10/10* (2013.01)

(58) Field of Classification Search
CPC ....... G06Q 40/08; G06Q 50/22; G06Q 10/087

USPC .................. 705/35, 36, 38, 2, 4, 3, 30; 1/1; 235/379; 345/419

See application file for complete search history.

(56) References Cited

U.S. PATENT DOCUMENTS

| | | | |
|---|---|---|---|
| 5,586,330 A * | 12/1996 | Knudsen et al. ............. 717/136 |
| 6,021,397 A | 2/2000 | Jones et al. |
| 6,792,410 B1 * | 9/2004 | Donovan et al. .................. 705/4 |
| 7,509,265 B1 * | 3/2009 | Gulko et al. ...................... 705/4 |
| 7,822,621 B1 | 10/2010 | Chappel |
| 8,103,522 B1 | 1/2012 | Galas et al. |
| 8,434,031 B2 * | 4/2013 | Granik ............................ 716/54 |
| 8,639,528 B1 * | 1/2014 | Cave ................................. 705/2 |
| 2001/0042785 A1 | 11/2001 | Walker et al. |
| 2004/0117302 A1 | 6/2004 | Weichert et al. |
| 2007/0260646 A1 | 11/2007 | Szlam |
| 2009/0204448 A1 | 8/2009 | Kaehler et al. |
| 2012/0029950 A1 | 2/2012 | Lyle et al. |
| 2013/0262148 A1 | 10/2013 | Weber et al. |

(Continued)

OTHER PUBLICATIONS

Ortega et al. "A Medical Claim Fraud/Abuse Detection System based on Data Mining: A Case Study in Chile." 2006 DMIN, 6, pp. 26-29.*

(Continued)

*Primary Examiner* — Kelly S Campen
(74) *Attorney, Agent, or Firm* — Alston & Bird LLP

(57) ABSTRACT

Systems, methods, apparatus, and computer program products are provided for processing claims. In various embodiments, claims can be processed in accordance with a data-driven approach that limits changes to existing claims processing rules by using an inclusions table, an exclusions table, and/or a decision table as part of firing or executing claims processing rules to accommodate for such changes.

21 Claims, 12 Drawing Sheets

(56) References Cited

U.S. PATENT DOCUMENTS

2013/0262149 A1 10/2013 Weber et al.
2013/0262150 A1 10/2013 Weber et al.

OTHER PUBLICATIONS

Sawar, Mohammad J., Umair Abdullah, and Aftab Ahmed. "Enhanced Design of a rule based engine implemented using structured query language." 2010 Proceedings of the World Congress on Engineering. vol. 1.*
United States Patent and Trademark Office, Office Action for U.S. Appl. No. 15/040,265, dated Oct. 6, 2016, 52 pages, U.S.A.
United States Patent and Trademark Office, Office Action for U.S. Appl. No. 15/040,244, dated Oct. 6, 2016, 52 pages, U.S.A.
United States Patent and Trademark Office, Office Action for U.S. Appl. No. 15/040,265, dated May 3, 2017, 45 pages, U.S.A.
United States Patent and Trademark Office, Office Action for U.S. Appl. No. 15/040,265, dated Nov. 17, 2017, 40 pages, U.S.A.
United States Patent and Trademark Office, Office Action for U.S. Appl. No. 13/444,170, dated Sep. 4, 2015, 12 pages, U.S.A.
United States Patent and Trademark Office, Office Action for U.S. Appl. No. 13/444,153, dated Sep. 23, 2015, 16 pages, U.S.A.
United States Patent and Trademark Office, Office Action for U.S. Appl. No. 13/444,153, dated Jul. 12, 2013, 17 pages, U.S.A.
United States Patent and Trademark Office, Office Action for U.S. Appl. No. 13/444,170, dated Aug. 8, 2014, 18 pages, U.S.A.
United States Patent and Trademark Office, Office Action for U.S. Appl. No. 13/444,153, datedAug. 11, 2014, 19 pages, U.S.A.
United States Patent and Trademark Office, Office Action for U.S. Appl. No. 13/444,170, dated May 15, 2015, 17 pages, U.S.A.
United States Patent and Trademark Office, Office Action for U.S. Appl. No. 13/444,153, dated May 27, 2015, 16 pages, U.S.A.
United States Patent and Trademark Office, Office Action for U.S. Appl. No. 13/435,119, dated Jan. 16, 2015, 22 pages, U.S.A.
United States Patent and Trademark Office, Office Action for U.S. Appl. No. 13/435,119, dated Jul. 29, 2015, 31 pages, U.S.A.
United States Patent and Trademark Office, Office Action for U.S. Appl. No. 13/435,119, dated Jan. 29, 2016, 38 pages, U.S.A.
United States Patent and Trademark Office, Office Action for U.S. Appl. No. 13/435,119, dated Aug. 10, 2016, 41 pages, U.S.A.
United States Patent and Trademark Office, Office Action for U.S. Appl. No. 15/040,265, dated Jun. 17, 2016, 55 pages, U.S.A.
United States Patent and Trademark Office, Office Action for U.S. Appl. No. 15,040,224, dated Jun. 16, 2016, 55 pages, U.S.A.

* cited by examiner

DATA-DRIVEN CONCEPTS FOR PROCESSING CLAIMS

CROSS-REFERENCE TO RELATED APPLICATIONS

This application is a continuation of U.S. patent application Ser. No. 13/444,170 filed Apr. 11, 2012, which a continuation-in-part of U.S. patent application Ser. No. 13/435,119, filed on Mar. 30, 2012, which are hereby incorporated herein in their entireties by reference.

BACKGROUND

Generally, claims payment systems are very complex. Claims systems often process a high volume of claims in accordance with dynamic medical policies, payment policies, contract terms, and benefit plans. Updating and changing multi-line claim rules enforcing such policies, plans, and terms can require a significant amount of time, effort, and expense. Thus, a need exists for a more efficient and cost-effective manner for handling updates and changes to multi-line claim rules.

BRIEF SUMMARY

In general, embodiments of the present invention provide systems, methods, apparatus, and computer program products for processing a claim.

In accordance with one aspect, a method for processing a claim is provided. In one embodiment, the method comprises (1) processing a current claim line in accordance (a) with a first claims processing rule and (b) a first support claim line; (2) determining whether an entry exists in a table for the first claims processing rule, wherein the entry for the first claims processing rule indicates how to process the current claim line when the current claim line and a support claim line satisfy the requirements of the entry for the first claims processing rule; (3) after determining that an entry exists in the table for the first claims processing rule, determining whether the current claim line and the first support claim line satisfy the requirements of the entry for the first claims processing rule; and (4) after determining that the current claim line and the first support claim line satisfy the requirements of the entry for the first claims processing rule, determining how to process the current claim line based at least in part on the entry for the first claims processing rule.

In accordance with another aspect, a computer program product for processing a claim is provided. The computer program product may comprise at least one computer-readable storage medium having computer-readable program code portions stored therein, the computer-readable program code portions comprising executable portions configured to (1) process a current claim line in accordance (a) with a first claims processing rule and (b) a first support claim line; (2) determine whether an entry exists in a table for the first claims processing rule, wherein the entry for the first claims processing rule indicates how to process the current claim line when the current claim line and a support claim line satisfy the requirements of the entry for the first claims processing rule; (3) after determining that an entry exists in the table for the first claims processing rule, determine whether the current claim line and the first support claim line satisfy the requirements of the entry for the first claims processing rule; and (4) after determining that the current claim line and the first support claim line satisfy the requirements of the entry for the first claims processing rule, determine how to process the current claim line based at least in part on the entry for the first claims processing rule.

In accordance with yet another aspect, an apparatus comprising at least one processor and at least one memory including computer program code is provided. In one embodiment, the at least one memory and the computer program code may be configured to, with the processor, cause the apparatus to at least (1) process a current claim line in accordance (a) with a first claims processing rule and (b) a first support claim line; (2) determine whether an entry exists in a table for the first claims processing rule, wherein the entry for the first claims processing rule indicates how to process the current claim line when the current claim line and a support claim line satisfy the requirements of the entry for the first claims processing rule; (3) after determining that an entry exists in the table for the first claims processing rule, determine whether the current claim line and the first support claim line satisfy the requirements of the entry for the first claims processing rule; and (4) after determining that the current claim line and the first support claim line satisfy the requirements of the entry for the first claims processing rule, determine how to process the current claim line based at least in part on the entry for the first claims processing rule.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIGS. 4-12 show exemplary input and output that can be used in accordance with various embodiments of the present invention.

DETAILED DESCRIPTION

Figure 1:
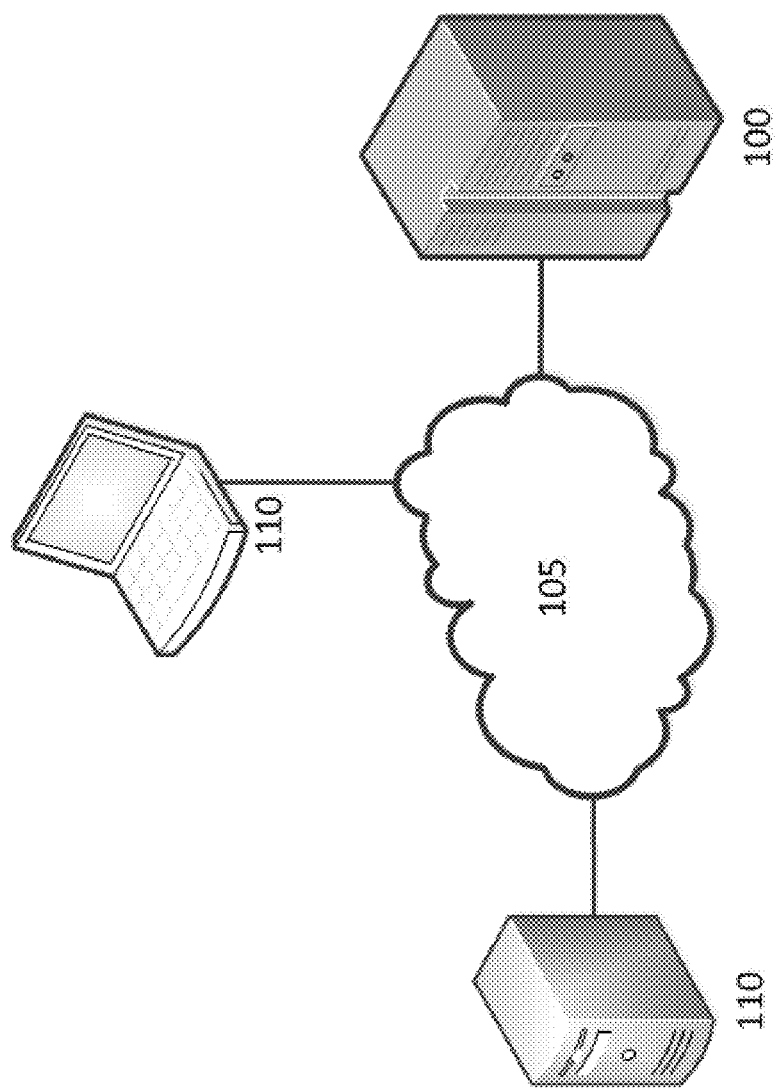
FIG. 1 is an overview of a system according to various embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. Methods, Apparatus, Systems, and Computer Program Products

As should be appreciated, various embodiments may be implemented in various ways, including as methods, apparatus, systems, or computer program products. Accordingly, various embodiments may take the form of an entirely hardware embodiment or an embodiment in which a processor is programmed to perform certain steps. Furthermore, various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

Various embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

II. Exemplary System Architecture

FIG. 1 provides an illustration of a system that can be used in conjunction with various embodiments of the present invention. As shown in FIG. 1, the system may include one or more claims systems 100, one or more networks 105, and one or more customer computing entities 110. Each of the components of the system may be in electronic communication with, for example, one another over the same or different wireless or wired networks including, for example, a wired or wireless Personal Area Network (PAN), Local Area Network (LAN), Metropolitan Area Network (MAN), Wide Area Network (WAN), or the like. Additionally, while FIG. 1 illustrates the various system entities as separate, standalone entities, the various embodiments are not limited to this particular architecture.

1. Exemplary Claims System

Figure 2:
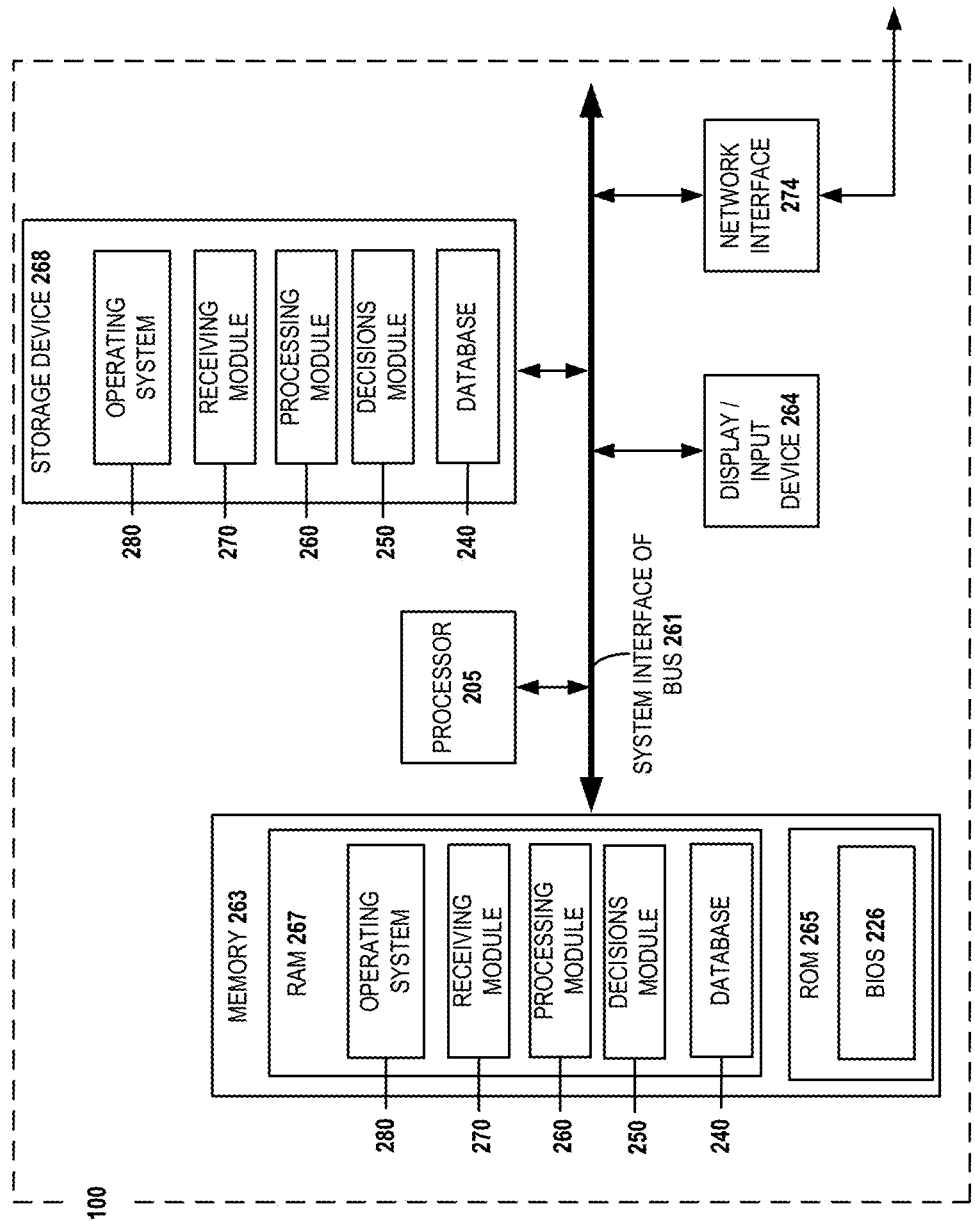
FIG. 2 is an exemplary schematic diagram of a claims system according to one embodiment of the present invention.

FIG. 2 provides a schematic of a claims system 100 according to one embodiment of the present invention. In general, the term "system" may refer to, for example, any computer, computing device, mobile phone, desktop, tablet, notebook or laptop, database management system, distributed system, server, blade, gateway, switch, processing device, or combination of processing devices adapted to perform the functions described herein.

As will be understood from FIG. 2, in one embodiment, the claims system 100 may include a processor 205 that communicates with other elements within the claims system 100 via a system interface or bus 261. The processor 205 may be embodied in a number of different ways. For example, the processor 205 may be embodied as a processing element, processing circuitry, a coprocessor, a controller or various other processing devices including integrated circuits such as, for example, an application specific integrated circuit (ASIC), a field programmable gate array (FPGA), a hardware accelerator, and/or the like.

In an exemplary embodiment, the processor 205 may be configured to execute instructions stored in memory or otherwise accessible to the processor 205. As such, whether configured by hardware or software methods, or by a combination thereof, the processor 205 may represent an entity capable of performing operations according to embodiments of the present invention when configured accordingly. For example, as discussed in more detail below, the claims system 100 may be configured, among other things, to process and analyze claims. A display/input device 264 for receiving and displaying data may also be included in (or in communication with) the claims system 100. This display device/input device 264 may be, for example, a keyboard or pointing device that is used in combination with a monitor (e.g., an electronic screen/display). The display/input device 264 may be a touchscreen that can detect the presence and location of a touch within the display area. The claims system 100 may further include transitory and non-transitory memory 263, which may include both random access memory (RAM) 267 and read only memory (ROM) 265. The claims system's ROM 265 may be used to store a basic input/output system (BIOS) 226 containing the basic routines that help to transfer information to the different elements within the claims system 100.

In addition, in one embodiment, the claims system 100 may include at least one storage device 268, such as a hard disk drive, a CD drive, and/or an optical disk drive for storing information on various computer-readable media. The storage device(s) 268 and its associated computer-readable media may provide nonvolatile storage. The computer-readable media described above could be replaced by any other type of computer-readable media, such as embedded or removable multimedia memory cards (MMCs), secure digital (SD) memory cards, Memory Sticks, electrically erasable programmable read-only memory (EEPROM), flash memory, hard disk, and/or the like. Additionally, each of these storage devices 268 may be connected to the system bus 261 by an appropriate interface.

Furthermore, a number of executable instructions, applications, scripts, program modules, and/or the like may be stored by the various storage devices 268 and/or within RAM 267. Such executable instructions, applications, scripts, program modules, and/or the like may include an operating system 280, a receiving module 270, a processing module 260, and an decisions module 250. As discussed in more detail below, these executable instructions, applications, program modules, and/or the like may control certain aspects of the operation of the claims system 100 with the assistance of the processor 205 and operating system 280 (and be selectively enabled and/or disabled)—although their functionality need not be modularized. In addition to the program modules, the claims system 100 may store or be in communication with one or more databases, such as database 240 storing claims processing rules and/or claims.

Also located within the claims system 100, in one embodiment, is a network interface 274 for interfacing with various computing entities, including a print computing entity. This communication may be via the same or different wired or wireless networks (or a combination of wired and wireless networks). For instance, the communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the claims system 100 may be configured to communicate via wireless external communication networks using any of a variety of protocols, such as 802.11, general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth™ protocols, wireless universal serial bus (USB) protocols, and/or any other wireless protocol.

It will be appreciated that one or more of the claims system's 100 components may be located remotely from other claims system 100 components. Furthermore, one or more of the components may be combined and additional components performing functions described herein may be included in the claims system 100.

2. Exemplary Customer Computing Entity

Embodiments of the present invention may involve the use of one or more customer computing entities 110. Generally, the term "computing entity" may refer to, for example, any computer, computing device, mobile phone, desktop, tablet, notebook or laptop, database management system, distributed system, server, blade, gateway, switch, processing device, or combination of processing devices adapted to perform the functions described herein. Further, the customer computing entity may refer to a computing entity associated with a doctor, a hospital, a pharmacy, an insurance provider, a care manager, and/or other healthcare-related entities or professionals.

As will be recognized, the customer computing entity 110 may include components similar to those described with regard to the claims system 100. For example, the customer computing entity 110 may comprise: (1) a processor that communicates with other elements via a system interface or bus; (2) a display device/input device; (3) memory including both ROM and RAM; (4) a storage device; and (5) a network interface. Similarly, a customer computing entity 110 may comprise executable instructions, applications, scripts, program modules, and/or the like. As will be recognized, these architectures are provided for exemplary purposes only and are not limited to the various embodiments.

III. Exemplary System Operation

Figure 3:
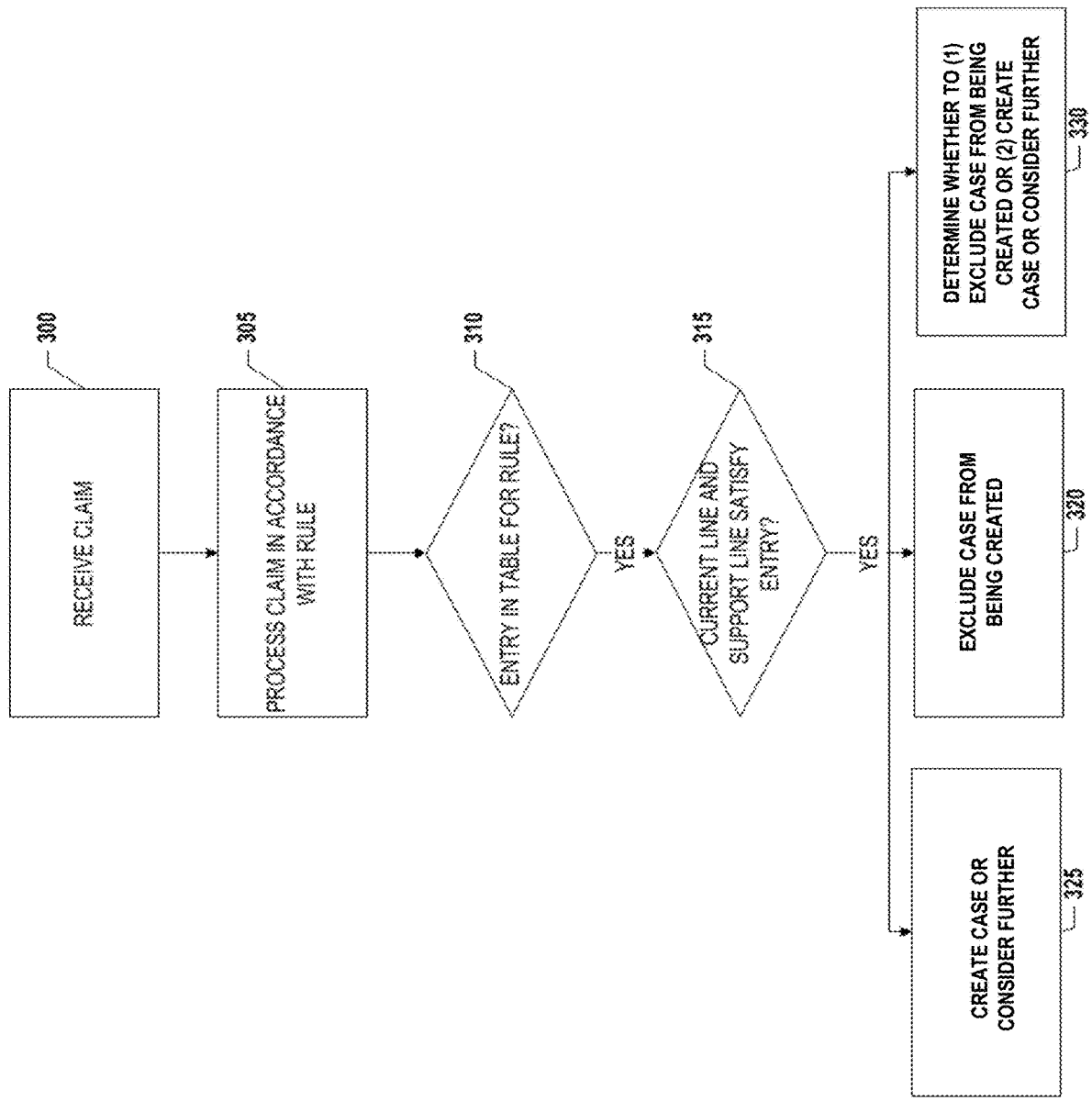
FIG. 3 is a flowchart illustrating operations and processes that can be used in accordance with various embodiments of the present invention.
Figure 4:
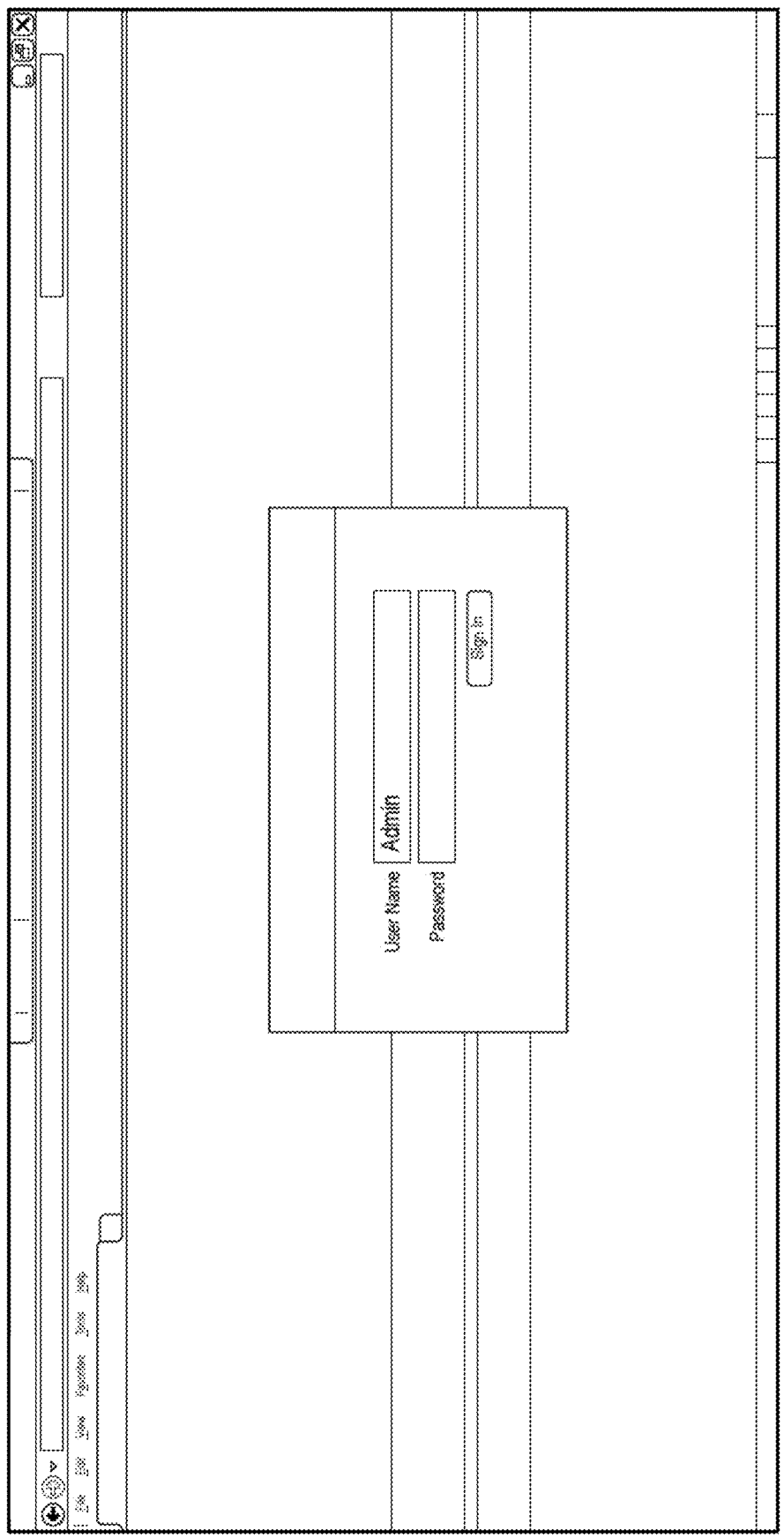

Reference will now be made to FIGS. 3-12. FIG. 3 is a flowchart illustrating operations and processes that may be performed for processing claims. FIGS. 4-12 show exemplary input and output that can be used in accordance with various embodiments of the present invention.

1. Claims

In one embodiment, the process may begin at Block 300 of FIG. 3 with the claims system 100 receiving (e.g., via the receiving module 270,) a claim from a customer computing entity 110 for processing. As will be recognized, a claim may be a request for payment/reimbursement for services rendered, materials used, equipment provided, and/or the like. For example, a claim may be a request for payment/reimbursement for a consultation with a primary care doctor, a medical procedure or an evaluation performed by an orthopedic surgeon, a laboratory test performed by a laboratory, durable medical equipment provided to an injured member, medications or other materials used in the treatment of a member, and/or the like.

Figure 5:
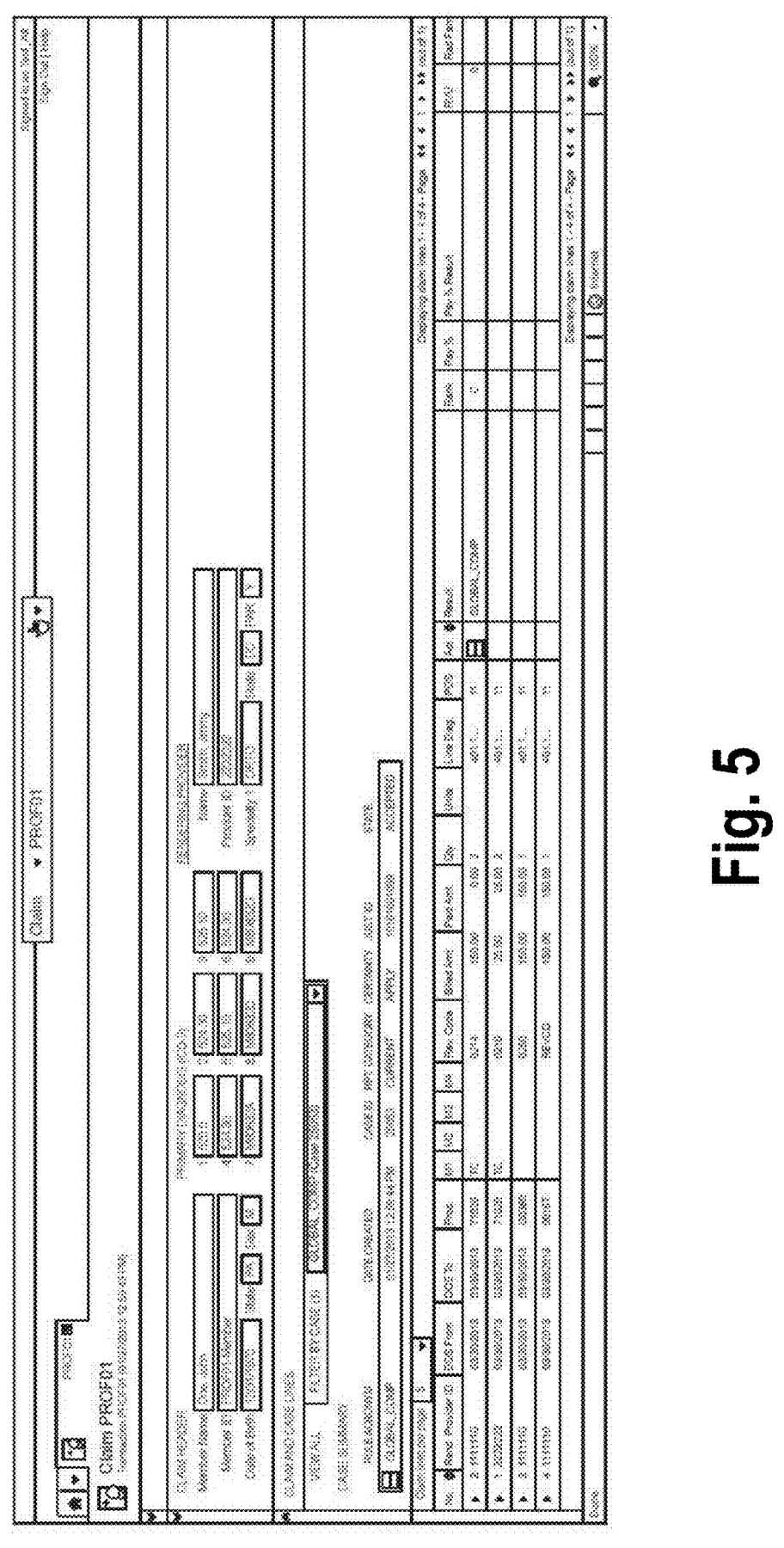

In one embodiment, each claim may include a claim header. An exemplary claim header is shown in FIG. 5. As seen in this figure, the claim header may include information associated with the member, such as the member's name, identification number, date of birth, gender, address, medical record number, assigned physicians, and/or the like. The claim header may also include provider information, such as the provider's name, contract number, certifications, identification number, address, license numbers, and/or the like. As will be recognized though, embodiments of the present invention may be applied to a variety of other settings, such as automotive claims, repair claims, and/or the like.

In one embodiment, in addition to a claim header, a claim may have one or more lines (see FIG. 5). A line may be a request for payment/reimbursement for services rendered, materials used, and/or equipment provided for one or more dates of service. Thus, each line may correspond to at least one line procedure code that is used to request payment/reimbursement for the corresponding service, material, and/or equipment. Such codes may be Current Procedural Terminology (CPT) codes, Healthcare Common Procedure Coding System (HCPCS) codes, and/or the like. By way of example, a member may visit a doctor because of discomfort in his lower leg. During the visit, the doctor may examine the member's lower leg, clean a wound on the leg, take an x-ray of the lower leg, and provide the member with a compression stocking to wear on the lower leg as a result of the examination. A claim for such a visit may be submitted with four lines using distinct line procedure codes: line procedure code 99215; line procedure code 11000; line procedure code 73590; and line procedure code A6542. Line procedure code 99215 may be used to request payment/reimbursement for the visit, examination, and evaluation of the member. Line procedure code 11000 may be used to request payment/reimbursement for cleaning the wound on the leg. Line procedure code 73590 may be used to request payment/reimbursement for the x-ray of the leg. And line procedure code A6542 may be used to request payment/reimbursement for the compression stocking provided to the member.

2. Claims Processing Rules

In one embodiment, after receiving a claim, the claims system 100 can process the lines of the claim in accordance with various claims processing rules. As will be recognized, claims processing rules may be executable instructions or computer program code stored in memory that can be executed and applied to claim lines by the claims system 100 (e.g., via the processing module 260) for pricing claims, scoring claims, auditing claims, bundling claims, and/or the like. Claims processing rules may also be for enforcing various policies, guidelines, requirements, contractual terms, and/or the like. For instance, claims processing rules can be used to enforce provisions of a provider's contract, contracted payment/reimbursement amounts, covered services and equipment of a benefit plan, copays, age limits, deductibles, and/or the like. Thus, there may be a set of claims processing rules for each benefit plan, for each provider, for certain services and/or equipment, for certain line procedure codes, combinations thereof, and/or the like.

Figure 6:
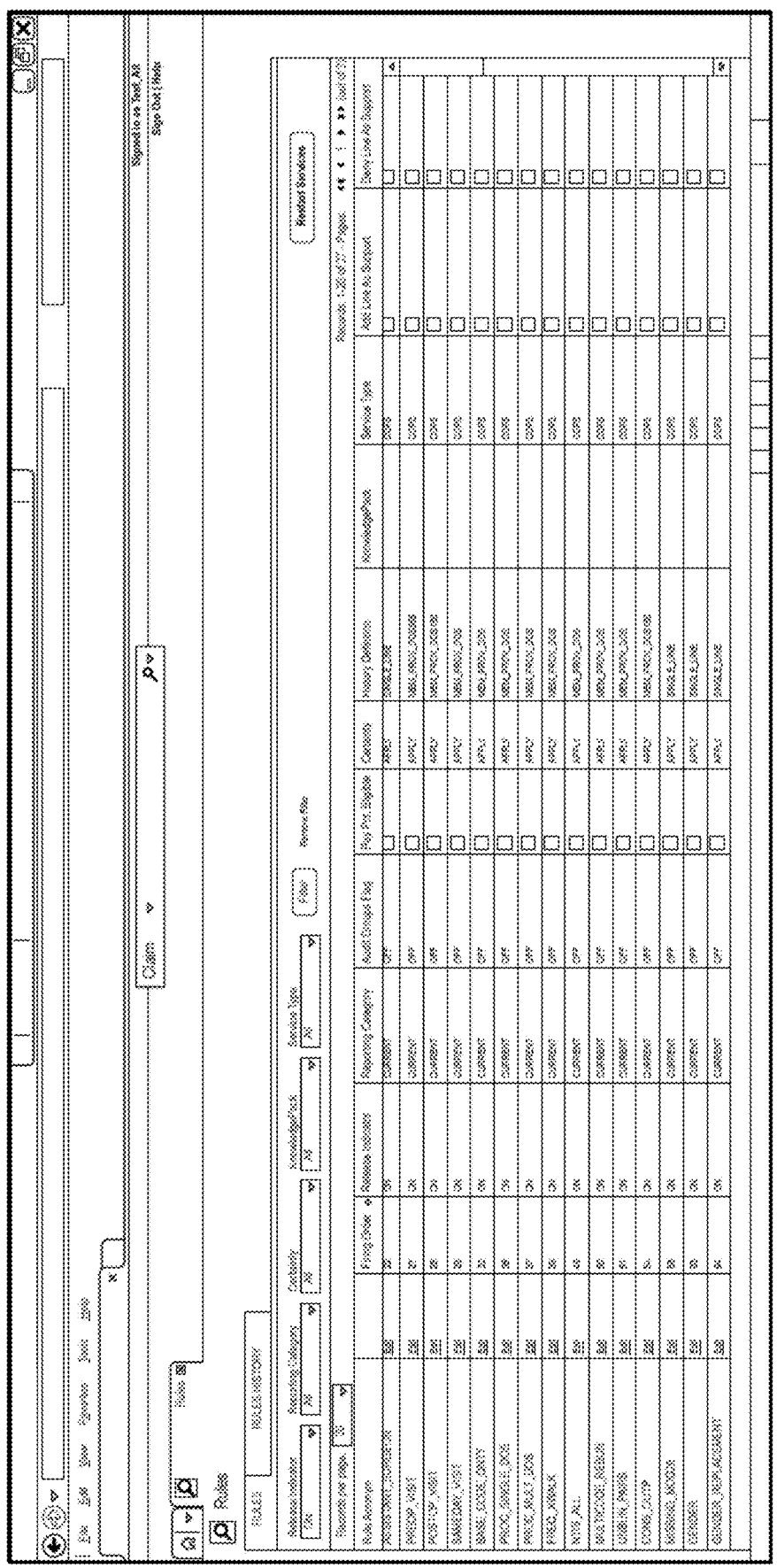
Figure 7:
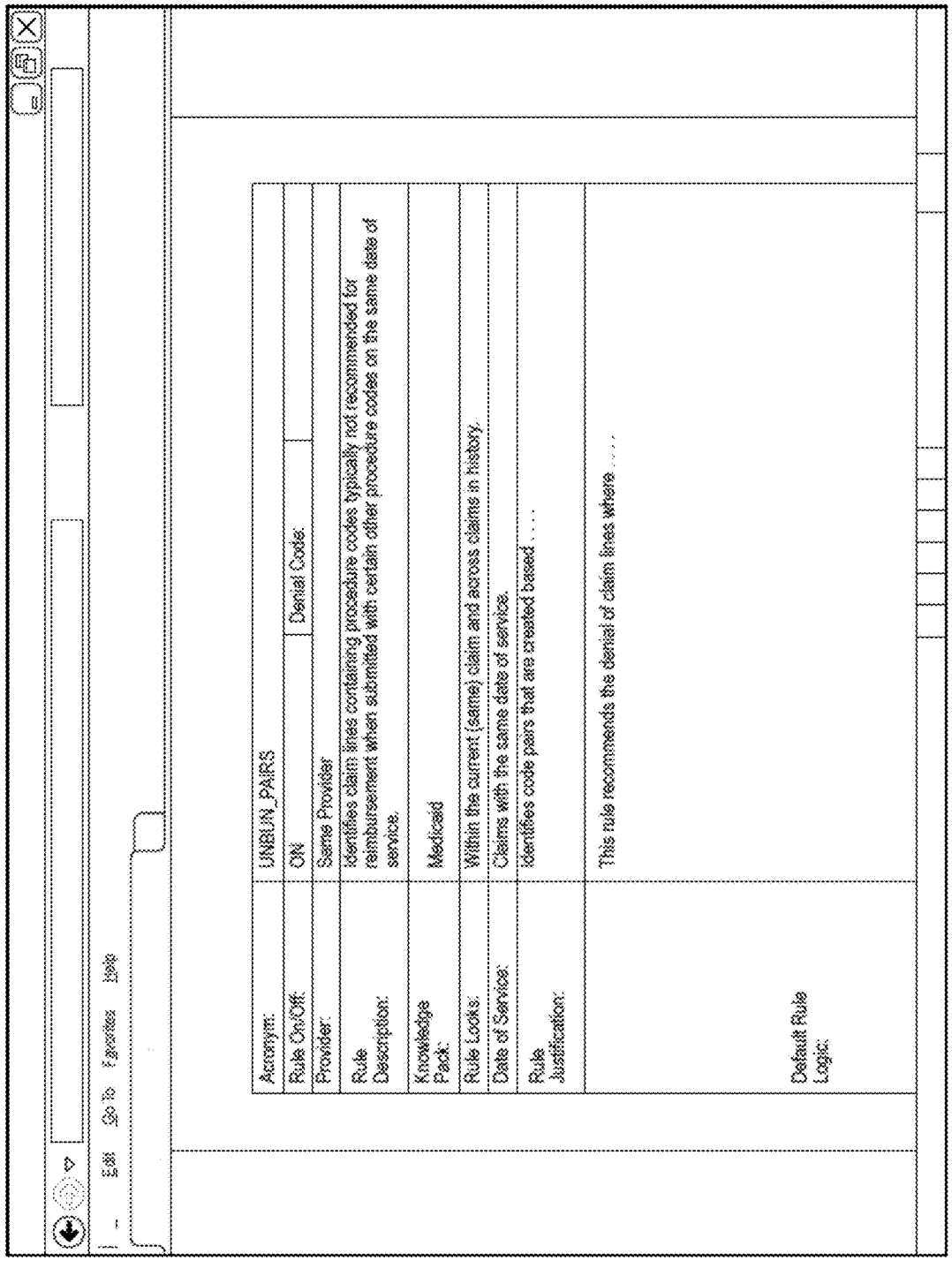
Figure 8:
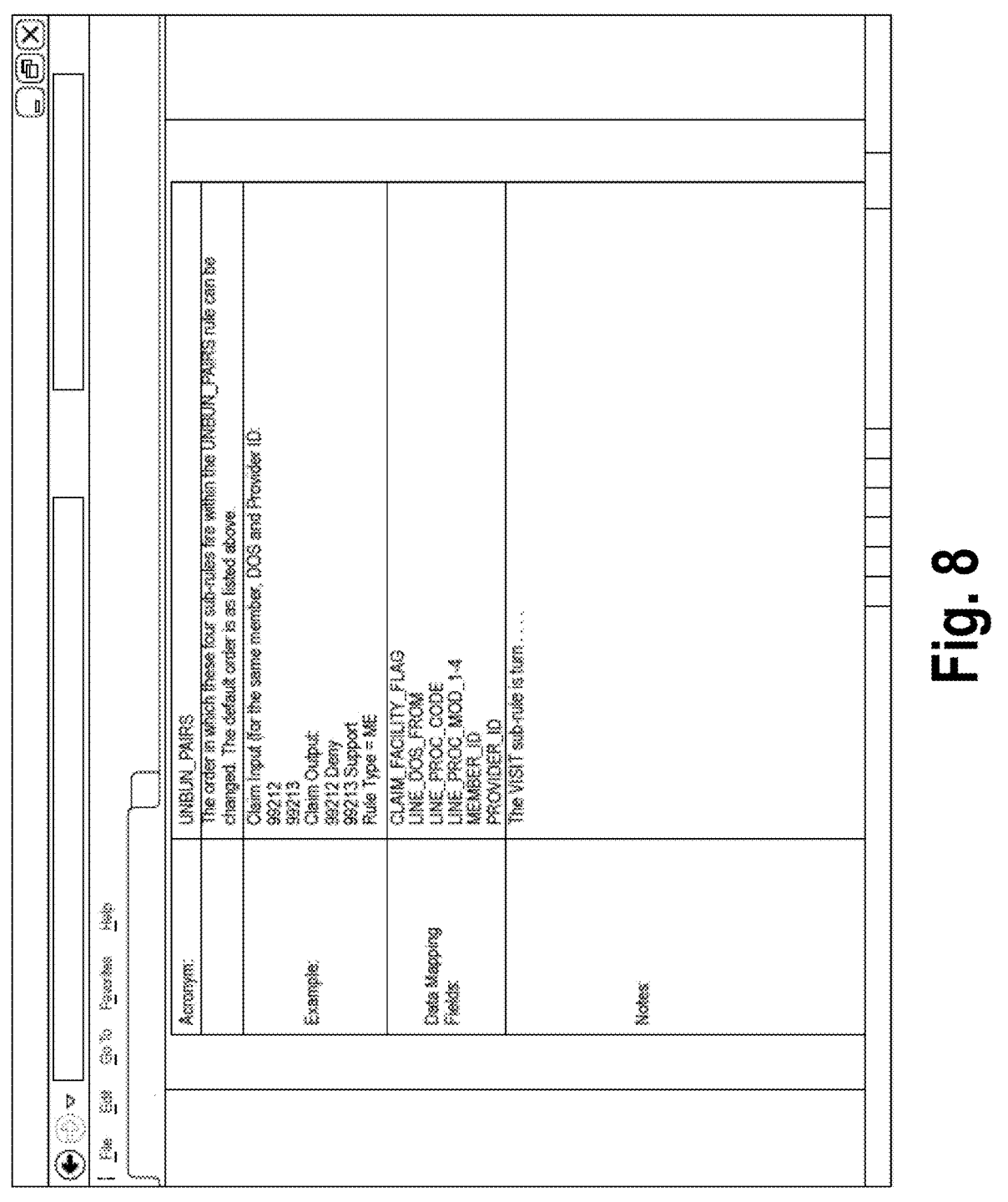

FIGS. 6-9 are provided for ease in understanding claims processing rules. In one embodiment, each claims processing rule may have a specification. For example, as shown in FIGS. 7 and 8, the specification for the unbundling claims processing rule indicates that the acronym for the rule is UNBUN_PAIRS. The claims processing rule may also include a rule description that indicates the purpose of the rule. For instance, the description for the UNBUN_PAIRS claims processing rule may indicate its purpose is for identifying codes that are not recommended for payment/reimbursement when submitted with others codes for a member on the same date of service from the same provider. Thus, the UNBUN_PAIRS claims processing rule may be designed to deny lines where the corresponding code is not recommended for payment/reimbursement when submitted with (a) a more comprehensive code, (b) a code that results in overlap of services, (c) a code corresponding to a procedure that is medically impossible or improbable of being performed on the same date of service as another submitted code. Continuing with the above example, the UNBUN_PAIRS claims processing rule may be used to consider a claim with multiple lines for an office visit submitted for the same member by the same provider on the same date of service. For instance, certain benefit plans may consider line procedure code 99215 as a comprehensive code that includes services such as the debridement of skin often billed separately using line procedure code 11000. Thus, when line procedure code 99215 and line procedure code 11000 are submitted for the same member on the same date of service by the same provider, the UNBUN_PAIRS claims processing rule may be designed to recommend payment/reimbursement for line procedure code 99215 and recommend denial for line procedure code 11000. As will be recognized, claims processing rules may be designed to adapt to various needs and circumstances.

In one embodiment, each claims processing rule can be set to "ON" or "OFF" (e.g., the ON or OFF can be used to indicate whether a rule is set to execute or not). Further, each claims processing rule may define a firing order (e.g., execution or processing order). The firing order may define the order or sequence in which the claims processing rule should fire or be executed by the claims system 100. For instance, each claims processing rule in FIG. 6 is set to ON. Further, in this figure, each claims processing rule has an assigned firing order between 22 and 94, indicating the order or sequence in which these rules will fire or execute. The firing order for the UNBUN_PAIRS claims processing rule is 51. Thus, depending on the number of claims processing rules set to ON and their firing order, the UNBUN_PAIRS claims processing rule may be the 51st rule to fire or execute in processing a claim. Correspondingly, the UNBUN_PAIRS claims processing rule may fire or execute earlier if any claims processing rules with earlier firing orders are set to OFF.

In one embodiment, the claims system 100 may process the claim on a line-by-line basis. When a line of a claim is being processed in accordance with a claims processing rule, it is considered as being the "current claim line." Certain claim lines are to be processed without reference to other claim lines. Any line considered in combination with the current claim line is considered a "support claim line." The history definition of a claims processing rule can define how the current claim line being processed should be considered. For instance, the history definition of a claims processing rule can define that one or more support claim lines should be used from the same claim, a different claim for the same date of service, a different claim for a different of service, and/or the like. Thus, support claim lines can be from the same claim or different claims. In a particular embodiment, the present invention is for processing a current claim in in consideration with one or more support claim lines. Continuing with the above example, as shown in FIGS. 7 and 8, the history definition for the UNBUN_PAIRS claims processing rule is MEM_PROV_DOS. This acronym indicates that current claim line should be processed in accordance with the UNBUN_PAIRS claims processing rule in consideration with all other claim lines (a) for the same member (b) from the same provider (c) on the same date of service.

In one embodiment, the rules specification may also define whether the claim should reference certain tables in a dictionary (see FIG. 9) as part of the execution or firing of a rule. Accordingly, when the claims system 100 executes a particular claims processing rule, the executable instructions or program code for the rule may reference one or more tables in a dictionary as a lookup (see FIG. 9). Exemplary tables are shown in FIGS. 9-12. As will be recognized, such tables may store information about the data in claims processing rules. For instance, the claims system 100 may store a table with all valid procedures codes for a provider, for certain services and/or equipment, for benefit plans, and/or the like. Thus, to determine whether a line procedure code is valid for a claim line, the claims system 100 may reference a table in the dictionary storing all valid procedures codes for the provider, certain services and/or equipment, benefit plan, and/or the like. If the code is present in the appropriate table, the claims system 100 can determine that the code is valid for the benefit plan, member, provider, and/or the like.

Further, as part of processing a line of a claim (Block 305 of FIG. 3), the claims system 100 can create/generate a recommendation as to whether each line of a claim should be paid, denied, and/or modified (e.g., recommended for payment/reimbursement in a manner other than as requested). When the claims system 100 creates/generates a recommendation to deny or modify a claim, the claims system creates/generates a "case." That is, the claims system 100 can create/generate a case when a claim line is not being recommended for payment/reimbursement as received. In operation, if a given claim line matches the requirement or requirements of a rule, the claims system 100 can create/generate a case for the rule or consider the line further to determine whether to create/generate a case. Continuing with the above example, the UNBUN_PAIRS rule may recommend paying/reimbursing the line for line procedure code 99215 and recommend denying the line for line procedure code 11000 because of the requirements matched in the rule.

In one embodiment, creating/generating a case for a given line may stop the processing of a claim such that additional claims processing rules would not be applied to the current claim line or other lines of the claim. In another embodiment, creating/generating a case for a given line might not stop the processing of the claim depending on the configuration; rather, it may allow for additional claims processing rules to be applied to the current claim line or other lines of the claim. If a claim is processed in accordance with all applicable claims processing rules without generating or creating a case, the claim is considered "cleared," and the claims system 100 can create/generate a recommendation to pay/reimburse the claim as submitted.

3. Data-Driven Approach to Changes to Claims Processing Rules

In one embodiment, if the logic of a claims processing rule is not operating as desired (e.g., denying or modifying lines that should be cleared), updates or changes to the appropriate claims processing rules may be necessary (and/or new claims processing rules may need to be created/generated). Similarly, when policies, guidelines, requirements, or contractual terms being enforced by claims processing rules are changed, changes to the claims processing rules may also be necessary. Such updates or changes to claims processing rules may require new or revised executable instructions or computer program code that carry out the revisions, changes, or updates to the corresponding rule. This may require both a significant amount of time and resources—including creating/generating new or revised executable instructions or computer program code may, updating a claims processing rule's specification, creating/generating test scenarios for the changes, reviewing and confirming the request with the client, and/or scheduling implementation of the rule once quality assurance steps are completed and approved. For instance, assume the Medicare guidelines were changed to allow line procedure code 11000 to be paid/reimbursed when submitted with line procedure code 99215. To prevent the claims system 100 from creating/generating a case when processing such a claim, the executable instructions or computer program code carrying out the UNBUN_PAIRS rule would normally need to be revised to accommodate the change.

Embodiments of the present invention, however, include a new data-driven approach for implementing revisions, changes, updates, and/or the like to claims processing rules. To do so, the processing module 260 and/or the claims processing rules can be updated to reference specific tables when processing multi-line claims. In one embodiment, the processing module 260 and/or the claims processing rule can be updated to reference a decisions table to determine how to handle/process the current claim line with a corresponding support claim line (e.g., whether to create/generate (or consider further for creating/generating) a case or to exclude a case from being created/generated). In another embodiment, the processing module 260 and/or the claims processing rule can be updated to reference an exclusions table to determine whether the current claim line should be excluded from creating/generating a case—even though the existing executable instructions or computer program code carrying out the rule may indicate that a case should be created/generated. And in yet another embodiment, the processing module 260 and/or the claims processing rule can be updated to reference an inclusions table to determine whether the current claim line should create/generate a case—even though the existing executable instructions or computer program code carrying out the rule may indicate that a case should not be created/generated.

Figure 9:
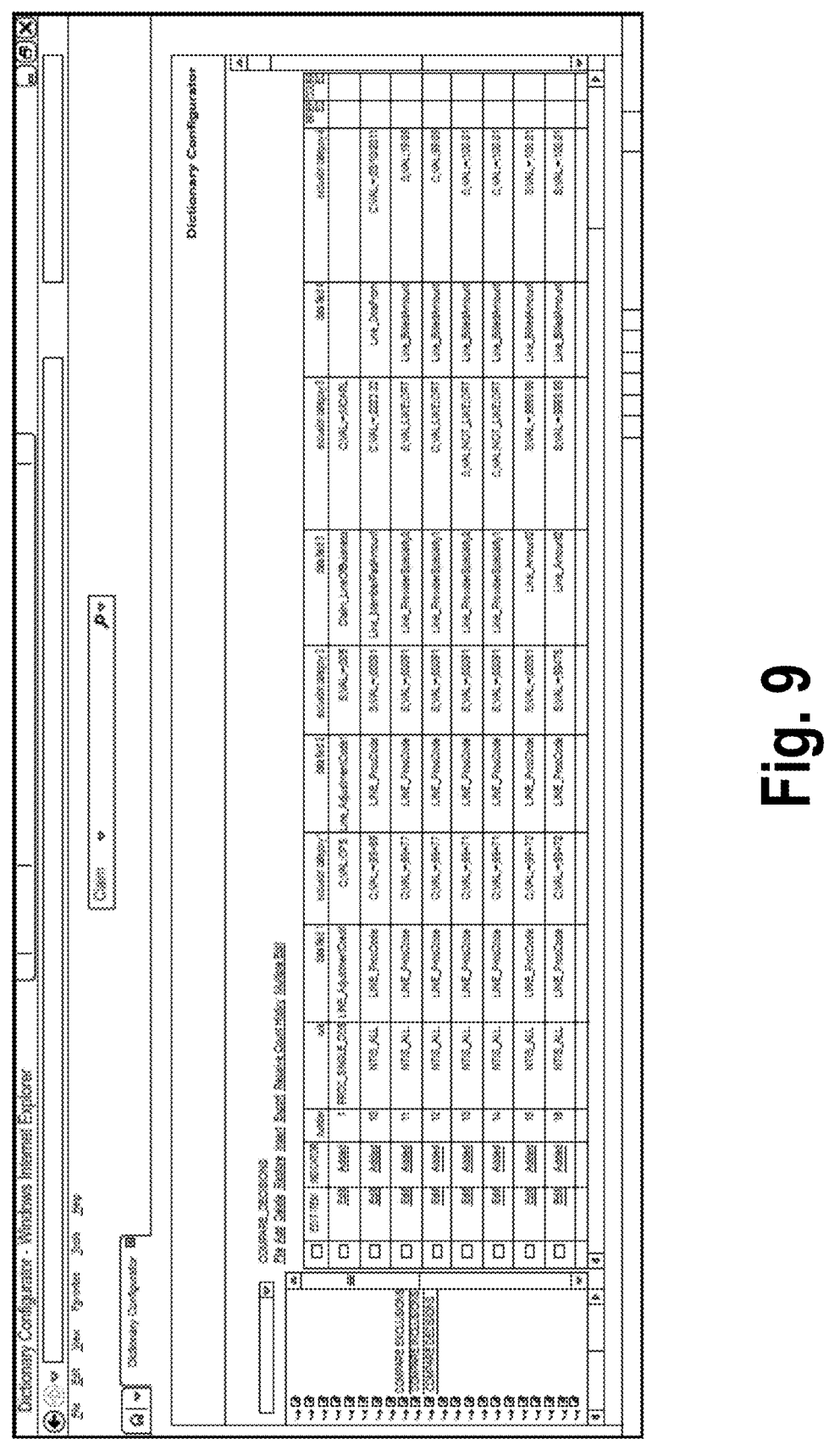
Figure 10:
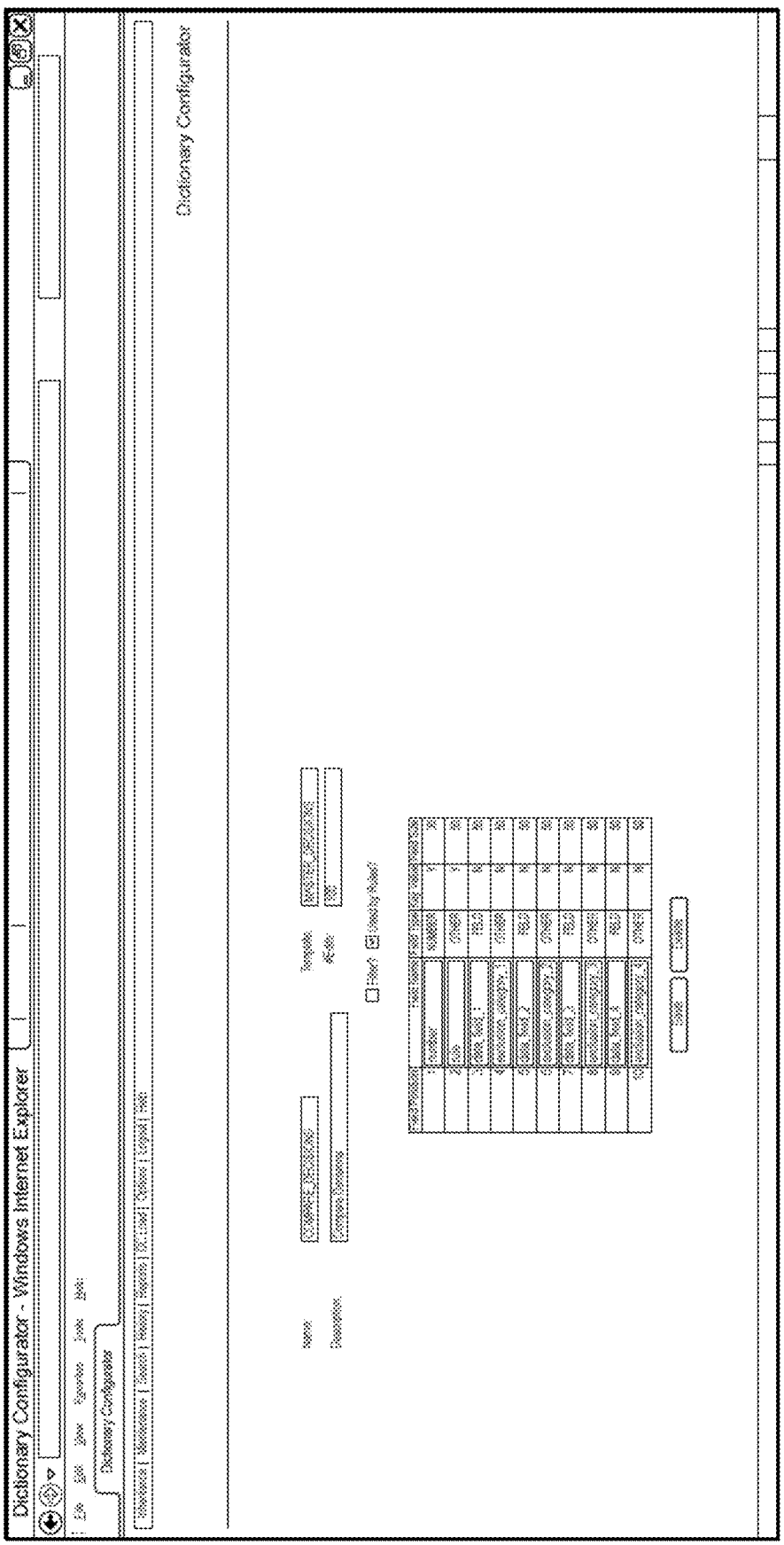
Figure 11:
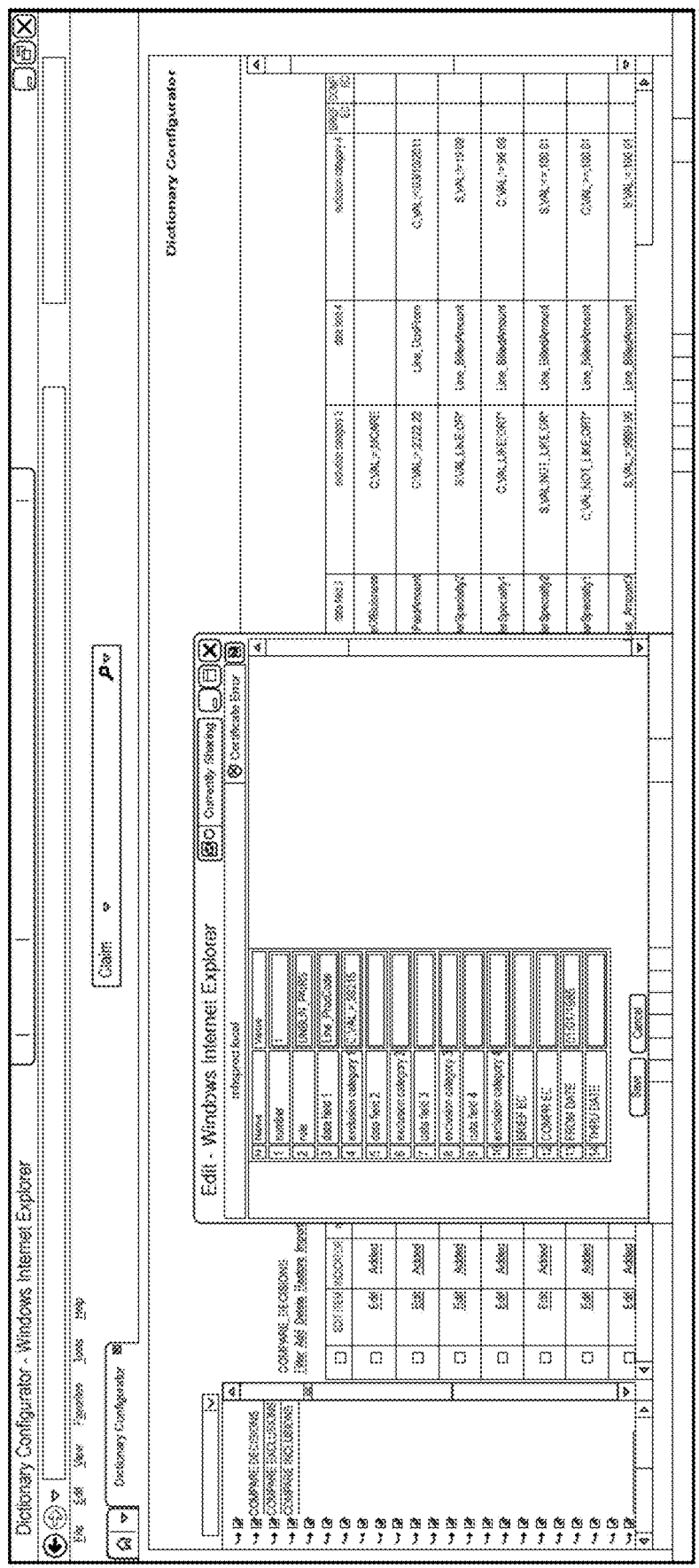

In an exemplary decision embodiment, the claims system can create/generate a decisions table (e.g., COMPARE_DECISIONS table) as a table in the dictionary. FIG. 9 shows different tables of an exemplary dictionary. As shown in FIGS. 10 and 11, the COMPARE_DECISIONS table can be used to define circumstances in which cases should either (1) not be created/generated even though a claims processing rule would ordinarily do so or (2) be created/generated (or considered further for creating/generating cases) even though a claims processing rule would not ordinarily do so.

FIG. 10 shows the creation/generation of a COMPARE_DECISIONS table. The COMPARE_DECISIONS table can define the field positions, the field names, the field types, the key values, the field sizes, and/or the like. The keys allow each rule to have 1-n decisions per rule. As shown in FIGS. 9-12, the first field (Key1) can be a unique number assigned to each row. The second field (Key2) can be the name of the rule associated with the corresponding entry. These two keys allow the claims system 100 to reference the table when executing a claims processing rule to determine whether any entries exist in the table for a given rule. In one embodiment, the third, fifth, seventh, and ninth fields (Lookup1, Lookup3, Lookup5, and Lookup7) can be data fields or name fields. And the fourth, sixth, eighth, and tenth fields (Lookup2, Lookup4, Lookup6, and Lookup8) can be the decision requirement(s) for the corresponding claims processing rule. Additional fields may also be used, such as a decision field (not shown) that can be populated with a "1" or "2," for instance. Thus, if a current claim line and any support claim line satisfy the requirements of an entry in the COMPARE_DECISIONS table, the claims system 100 can determine how to handle/process the lines based on the decision field value. For instance, if the decision field is populated with a "1" or a value that represents "exclude," then the claims system 100 can exclude a case from being created/generated for the current claim line and the corresponding support claim line(s) or consider the line further to determine whether to create/generate a case—as described herein with regard to the COMPARE_EXCLUSIONS table. Similarly, if the decision field is populated with a "2" or a value that represents "include," then the claims system 100 can create/generate a case (or consider further for creating/generating a case) for the current claim line and the corresponding support claim line(s) or consider the line further to determine whether to create/generate a case—as described herein with regard to the COMPARE_INCLUSIONS table. Similarly, if the decision field is populated with another value other than the one for include or exclude, then the claims system 100 can determine how to act upon that current claim line/support claim line combination accordingly. Additional fields may also be used, such as date ranges, member restrictions, and/or the like. As will be recognized, the field positions, field names, field types, key values, field sizes, format, and syntax of the decisions table can be modified to adapt to various needs and circumstances.

In an exemplary exclusion embodiment, the claims system 100 can create/generate an exclusions table (e.g., COMPARE_EXCLUSIONS table) as a table in the dictionary. The COMPARE_EXCLUSIONS table can be used to define circumstances in which cases should not be created/generated even though a claims processing rule would ordinarily do so. The COMPARE_EXCLUSIONS table can define the field positions, the field names, the field types, the key values, the field sizes, and/or the like. The keys allow each rule to have 1-n exclusions per rule. The first field (Key1) can be a unique number assigned to each row. The second field (Key2) can be the name of the rule associated with the corresponding entry. These two keys allow the claims system 100 to reference the table when executing a claims processing rule to determine whether any entries exist in the table for a given rule. In one embodiment, the third, fifth, seventh, and ninth fields (Lookup1, Lookup3, Lookup5, and Lookup7) can be data fields or name fields. And the fourth, sixth, eighth, and tenth fields (Lookup2, Lookup4, Lookup6, and Lookup8) can be the exclusion requirement(s) for the corresponding claims processing rule. Additional fields may also be used, such as date ranges, member restrictions, and/or the like.

In an exemplary inclusion embodiment, the claims system can create/generate an inclusions table (e.g., COMPARE_INCLUSIONS table) as a table in the dictionary. Similar to the COMPARE_EXCLUSIONS, the COMPARE_INCLUSIONS table can be used to define circumstances in which cases should be created/generated even though a claims processing rule would not ordinarily do so. As with the COMPARE_EXCLUSIONS table, the COMPARE_INCLUSIONS table can define the field positions, the field names, the field types, the key values, the field sizes, and/or the like. The keys allow each rule to have 1-n inclusions per rule. The first field (Key1) can be a unique number assigned to each row. The second field (Key2) can be the name of the rule associated with the corresponding entry. These two keys allow the claims system 100 to reference the table when executing a claims processing rule to determine whether any entries exist in the table for a given rule. In one embodiment, the third, fifth, seventh, and ninth fields (Lookup1, Lookup3, Lookup5, and Lookup7) can be data fields or name fields. And the fourth, sixth, eighth, and tenth fields (Lookup2, Lookup4, Lookup6, and Lookup8) can be the inclusion requirement(s) for the corresponding claims processing rule. Additional fields may also be used, such as date ranges, member restrictions, and/or the like.

Figure 12:
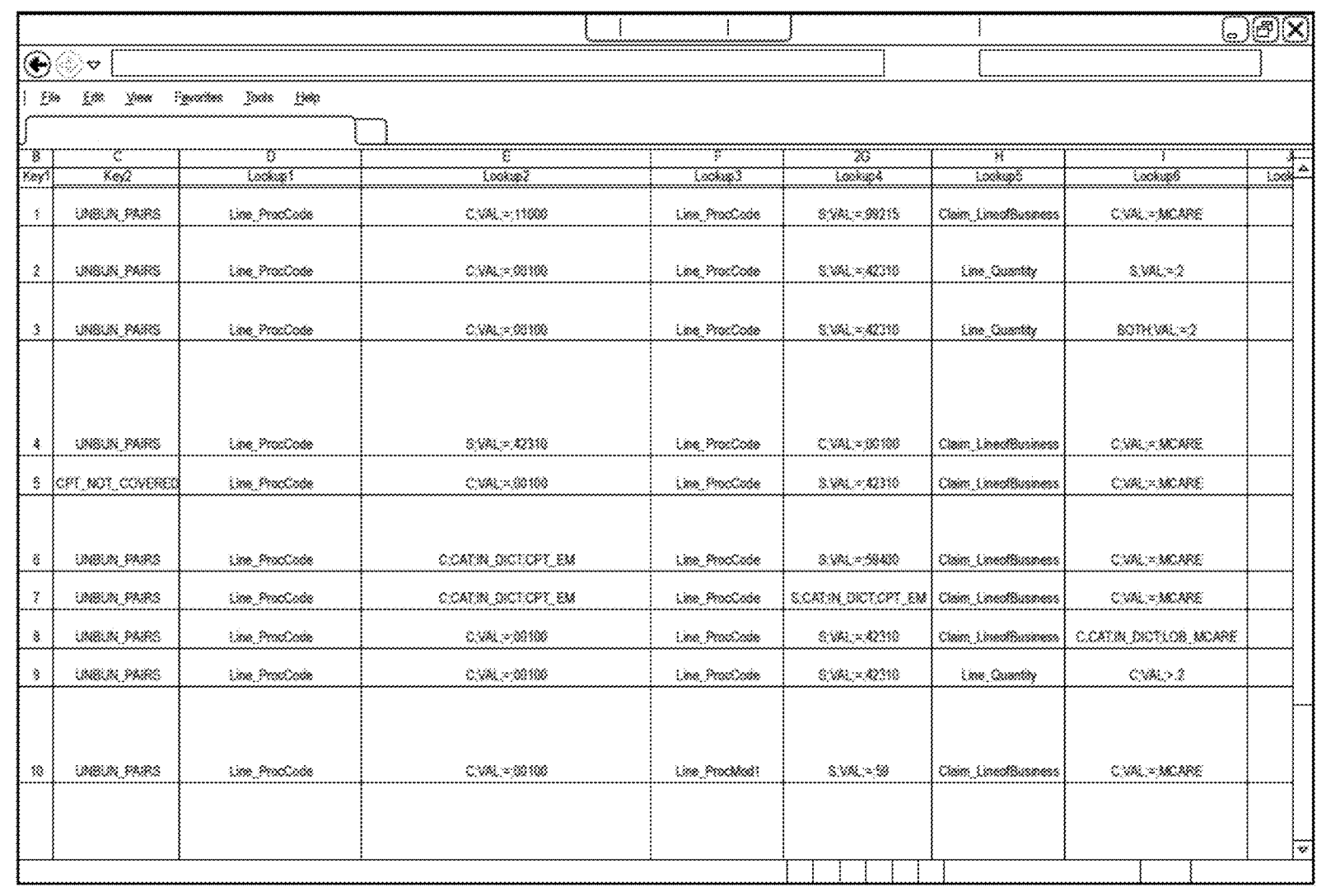

FIG. 11 shows an interface via which a customer (e.g., operating a customer computing entity 110) can input an entry into a table, such as the decisions table. Continuing with the above example, assume that the Medicare guidelines are changed to allow line procedure code 11000 to be paid/reimbursed when submitted with line procedure code 99215. Instead of revising or changing the executable instructions or computer program code carrying out the UNBUN_PAIRS rule, a customer (e.g., operating a customer computing entity 110) can input an entry into the COMPARE_DECISIONS table with a "1" in the decision field to exclude line procedure code 11000 and line procedure code 99215 from creating/generating a case when submitted for Medicare members on the same date of service from the same provider. As seen in FIGS. 11 and 12, the Key1 value for this entry is 1, and the Key2 value for this entry is UNBUN_PAIRS. Thus, when the claims system 100 processes a current claim line and a support claim line in accordance with the UNBUN_PAIRS claims processing rule, the claims system 100 can reference the COMPARE_DECISIONS table to determine if any entries exists for the UNBUN_PAIRS claims processing rule.

As also shown in these figures, this particular entry requires three lookups. The first lookup (Lookup1) requires access to a line procedure code in the claim (Line_ProcCode). The decision requirement for this lookup (Lookup2) requires that the current claim line procedure code be line procedure code 11000: C;VAL;=;11000. The second lookup (Lookup3) also requires access to a line procedure code in the claim (Line_ProcCode). The decision requirement for this lookup (Lookup4) requires that a support claim line's Line_ProcCode being considered with the current claim line be line procedure code 99215: S;VAL;=;99215. And the third lookup (Lookup5) requires access to the current claim line's line of business for the claim (Claim_LineofBusiness). The decision requirement for this lookup (Lookup6) requires that the line of business for the current claim be Medicare: C;VAL;=;MCARE. And finally, the decision field for this entry (not shown) is populated with a "1" indicating that a case should be excluded from being generated if the requirements for the entry are satisfied. Thus, this entry will be to exclude combinations where the current claim line with line procedure codes 11000 and Claim LineofBusiness code=MCARE (Medicare Member) and the support claim line with procedure code 99215 from creating/generating a case when considered together when being processed in accordance with the UNBUN_PAIRS rule. The various entries in the table can be used to create any number and types of decisions to adapt to various needs and circumstances, where at least one entry is for the current claim line and one entry is for a support claim line or the entry is for both lines.

In operation, after the claims system 100 receives a claim, the claims system 100 can process the claim on a line-by-line basis—one claims processing rule at a time (Block 305 of FIG. 3). During application of each claims processing rule including preprocessing for the rule), the claims system 100 can reference the one or more of the tables (e.g., decisions table, exclusions table, and/or inclusions table) to determine whether any entries exist in the table for the rule (Block 310). If one or more entries exist in the appropriate table for the rule, the claims system 100 can determine whether the current claim line and any support claim lines satisfy the requirements of the one or more entries (Block 315 of FIG. 3). If the current claim line and any appropriate support claim line satisfy the requirements of the entries, the combination of the current claim line and the appropriate support claim line are acted upon accordingly by the claims system (Blocks 320, 325, 330 of FIG. 3). If performed as a preprocessing step, the claims system 100 can then continue applying the corresponding rule.

Continuing with the above decisions example, the claims system 100 can process the claim submitted with four lines using distinct line procedure codes: line procedure code 99215; line procedure code 11000; line procedure code 73590; and line procedure code A6542. In the appropriate firing order, the claims system 100 can reach the UNBUN_PAIRS claims processing rule and apply it to the claim. As part of applying the rule, the claims system 100 can reference the COMPARE_DECISIONS table to determine if there are any entries for UNBUN_PAIRS rule. In this example, there are nine entries for UNBUN_PAIRS rule: (1) Key1: 1 and Key2: UNBUN_PAIRS; (2) Key1: 2 and Key2: UNBUN_PAIRS; (3) Key1: 3 and Key2: UNBUN_PAIRS; (4) Key1: 4 and Key2: UNBUN_PAIRS; (5) Key1: 6 and Key2: UNBUN_PAIRS; (6) Key1: 7 and Key2: UNBUN_PAIRS; (7) Key1: 8 and Key2: UNBUN_PAIRS; (8) Key1: 9 and Key2: UNBUN_PAIRS; and (9) Key1: 10 and Key2: UNBUN_PAIRS.

Then, the claims system 100 can determine whether the claims lines satisfy the requirements of any of these entries—starting with the first entry in the table and working its way down the entries in Key1 order. For each entry, the claims system 100 can evaluate the first line of the claim (line procedure code 99215) as being the current claim line and use the appropriate support claim lines defined by the UNBUN_PAIRS rule. Because the UNBUN_PAIRS rule only examines lines from the same member on the same date of service from the same provider, the claims system 100 could potentially evaluate each line of the claim against every other line. In this example, the claims system 100 would first evaluate line procedure code 99215 as the current claim line and line procedure code 11000 as the support claim line. If the requirements for the first entry are met, the claims system 100 would determine how to handle/process this combination of lines (e.g., determine whether to create/generate a case or to exclude a case from being created/ generated). If the requirements for the entry are not met by the lines, the claims system 100 would then evaluate the two lines in accordance with the next relevant entry in the table Key1="2" and work its way down.

If the requirements for the nine relevant entries are not met, the claims system 100 would then evaluate line procedure code 11000 as the current claim line and every other line in turn as a support claim line. Thus, in this iteration, the claims system 100 would evaluate line procedure code 11000 as the current claim line and line procedure code 99215 as the support claim line. The claims system 100 would then determine whether the lines satisfy the requirements of the first entry (Key1: 1 and Key2: UNBUN_PAIRS). In this case, the current claim line (line procedure code 11000) would satisfy the first requirement: C;VAL;=; 11000. Further, the support claim line (line procedure code 99215) would satisfy the second requirement: C;VAL;=; 99215. Thus, if this were a Medicare claim (C;VAL;=; MCARE), the claims system 100 would determine how to handle/process this combination of lines (e.g., determine whether to create/generate a case or to exclude a case from being created/generated). And because the decision field is populated with a "1", the claims system 100 would exclude this combination of lines creating/generating a case. If performed as a preprocessing step, the claims system 100 can then continue applying the UNBUN_PAIRS rule.

In various embodiments, the described techniques and approaches can provide for an inexpensive, responsive, and precise way for customizing claims processing rules through a data-driven method. In various embodiments, this allows changes to claims processing rules to be updated in an efficient manner. As will be recognized, other approaches and techniques can be used to adapt to various needs and circumstance. For example, similar processes could be used for implementing an inclusions table (e.g., COMPARE_INCLUSIONS table) and/or exclusions table (e.g., COMPARE_EXCLUSIONS table).

IV. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for processing insurance claims and controlling automatic creation, by a processor, of cases for representing insurance claims, the method comprising:
   processing a current claim line in accordance with (a) a first claims processing rule and (b) a first support claim line, wherein the first claims processing rule comprises (a) a rule name and (b) an indication to reference a database table stored in a database, in addition to applying the first claims processing rule, the database table comprising entries representing changes to insurance claim processing guidelines;
   determining, via the processor, that an entry exists in the database table for the first claims processing rule based at least in part on the rule name for the first claims processing rule, wherein the entry for the first claims processing rule indicates how to process the current claim line when the current claim line and a support claim line satisfy the requirements of the entry for the first claims processing rule;
   after determining, via the processor, that the entry exists in the database table for the first claims processing rule, determining whether the current claim line and the first support claim line satisfy the requirements of the entry for the first claims processing rule;
   determining, via the processor, that the current claim line and the first support claim line satisfy the requirements of the entry for the first claims processing rule and the database table comprising entries representing the changes to the insurance claim processing guidelines; and
   in response to determining that the current claim line and the first support claim line satisfy the requirements of the entry for the first claims processing rule and the database table, creating, by the processor, a case for the current claim line.

2. The method of claim 1 further comprising processing the current claim line in accordance (a) with a second claims processing rule and (b) a second support claim line.

3. The method of claim 2 further comprising determining whether an entry exists in the database table for the second claims processing rule, wherein the entry for the second claims processing rule indicates how to process the current claim line when the current claim line and a support claim line satisfy the requirements of the entry for the second claims processing rule.

4. The method of claim 3 further comprising:
   after determining that an entry exists in the database table for the second claims processing rule, determining whether the current claim line and the second support claim line satisfy the requirements of the entry for the second claims processing rule; and
   after determining that the current claim line and the second support claim line satisfy the requirements of the entry for the second claims processing rule, determining how to process the current claim line based at least in part on the entry for the second claims processing rule.

5. The method of claim 1, wherein the current claim line and the first support claim line satisfy a history definition of the first claims processing rule.

6. The method of claim 1, wherein the current claim line, the first support claim line, and the second support claim line are from the same claim.

7. The method of claim 1 further comprising receiving input creating the entry for the first claims processing rule in the database table.

8. A computer program product comprising at least one non-transitory computer-readable storage medium having computer-readable program code portions stored therein for processing insurance claims and controlling automatic creation, upon execution by a processor, of cases for representing insurance claims, the computer-readable program code portions comprising:
   an executable portion configured to process a current claim line in accordance with (a) a first claims processing rule and (b) a first support claim line, wherein the first claims processing rule comprises (a) a rule name and (b) an indication to reference a database table stored in a database in addition to applying the first claims processing rule, the database table comprising entries representing changes to insurance claim processing guidelines;
   an executable portion configured to determine that an entry exists in the database table for the first claims processing rule based at least in part on the rule name for the first claims processing rule, wherein the entry for the first claims processing rule indicates how to process the current claim line when the current claim line and a support claim line satisfy the requirements of the entry for the first claims processing rule;

an executable portion configured to, after determining that an entry exists in the database table for the first claims processing rule, determine whether the current claim line and the first support claim line satisfy the requirements of the entry for the first claims processing rule;

an executable portion configured to determine that the current claim line and the first support claim line satisfy the requirements of the entry for the first claims processing rule and the database table comprising entries representing the changes to the insurance claim processing guidelines; and an executable portion configured to, in response to determining that the current claim line and the first support claim line satisfy the requirements of the entry for the first claims processing rule and the database table, create, by the processor, a case for the current claim line.

9. The computer program product of claim 8 further comprising an executable portion configured to process the current claim line in accordance (a) with a second claims processing rule and (b) a second support claim line.

10. The computer program product of claim 9 further comprising an executable portion configured to determine whether an entry exists in the database table for the second claims processing rule, wherein the entry for the second claims processing rule indicates how to process the current claim line when the current claim line and a support claim line satisfy the requirements of the entry for the second claims processing rule.

11. The computer program product of claim 10 further comprising:

an executable portion configured to, after determining that an entry exists in the database table for the second claims processing rule, determine whether the current claim line and the second support claim line satisfy the requirements of the entry for the second claims processing rule; and an executable portion configured to, after determining that the current claim line and the second support claim line satisfy the requirements of the entry for the second claims processing rule, determine how to process the current claim line based at least in part on the entry for the second claims processing rule.

12. The computer program product of claim 8, wherein the current claim line and the first support claim line satisfy a history definition of the first claims processing rule.

13. The computer program product of claim 8, wherein the current claim line, the first support claim line, and the second support claim line are from the same claim.

14. The computer program product of claim 8 further comprising an executable portion configured to receive input creating the entry for the first claims processing rule in the database table.

15. An apparatus comprising at least one processor and at least one memory including computer program code for processing insurance claims and controlling automatic creation, by the at least one processor, of cases for representing insurance claims, the at least one memory and the computer program code configured to, with the at least one processor, cause the apparatus to at least:

process a current claim line in accordance with (a) a first claims processing rule and (b) a first support claim line, wherein the first claims processing rule comprises (a) a rule name and (b) an indication to reference a database table stored in a database in addition to applying the first claims processing rule, the database table comprising entries representing changes to insurance claim processing guidelines;

determine that an entry exists in the database table for the first claims processing rule based at least in part on the rule name for the first claims processing rule, wherein the entry for the first claims processing rule indicates how to process the current claim line when the current claim line and a support claim line satisfy the requirements of the entry for the first claims processing rule;

after determining that the entry exists in the database table for the first claims processing rule, determine whether the current claim line and the first support claim line satisfy the requirements of the entry for the first claims processing rule;

determine that the current claim line and the first support claim line satisfy the requirements of the entry for the first claims processing rule and the database table comprising entries representing the changes to the insurance claim processing guidelines; and in response to determining that the current claim line and the first support claim line satisfy the requirements of the entry for the first claims processing rule and the database table, create, by the at least one processor, a case for the current claim line.

16. The apparatus of claim 15, wherein the memory and computer program code are further configured to, with the at least one processor, cause the apparatus to process the current claim line in accordance (a) with a second claims processing rule and (b) a second support claim line.

17. The apparatus of claim 16, wherein the memory and computer program code are further configured to, with the at least one processor, cause the apparatus to determine whether an entry exists in the database table for the second claims processing rule, wherein the entry for the second claims processing rule indicates how to process the current claim line when the current claim line and a support claim line satisfy the requirements of the entry for the second claims processing rule.

18. The apparatus of claim 17, wherein the memory and computer program code are further configured to, with the at least one processor, cause the apparatus to:

after determining that an entry exists in the database table for the second claims processing rule, determine whether the current claim line and the second support claim line satisfy the requirements of the entry for the second claims processing rule; and after determining that the current claim line and the second support claim line satisfy the requirements of the entry for the second claims processing rule, determine how to process the current claim line based at least in part on the entry for the second claims processing rule.

19. The apparatus of claim 15, wherein the current claim line and the first support claim line satisfy a history definition of the first claims processing rule.

20. The apparatus of claim 15, wherein the current claim line, the first support claim line, and the second support claim line are from the same claim.

21. The apparatus of claim 15, wherein the memory and computer program code are further configured to, with the at least one processor, cause the apparatus to receive input creating the entry for the first claims processing rule in the database table.

* * * * *